(12) United States Patent
Pike et al.

(10) Patent No.: US 6,991,753 B2
(45) Date of Patent: Jan. 31, 2006

(54) TUNABLE CHIRAL FILM OPTICAL FILTER

(75) Inventors: Randy T. Pike, Grant, FL (US); Dennis Tebbe, Melbourne, FL (US)

(73) Assignee: Harris Corporation, Melbourne, FL (US)

(*) Notice: Subject to any disclaimer, the term of this patent is extended or adjusted under 35 U.S.C. 154(b) by 106 days.

(21) Appl. No.: 10/752,471

(22) Filed: Jan. 6, 2004

(65) Prior Publication Data
US 2005/0145828 A1    Jul. 7, 2005

(51) Int. Cl.
*G02B 5/22*     (2006.01)
*B32B 5/16*     (2006.01)
*F21V 9/14*     (2006.01)

(52) U.S. Cl. .............. 252/584; 252/589; 428/327; 428/339; 359/885; 385/141; 977/DIG. 1

(58) Field of Classification Search ......... 252/584, 252/589; 359/885; 385/140, 141; 977/DIG. 1; 428/327, 339
See application file for complete search history.

(56) References Cited

U.S. PATENT DOCUMENTS

| | | | |
|---|---|---|---|
| 5,241,417 A | 8/1993 | Sekiguchi | |
| 6,178,039 B1 | 1/2001 | Fujita | |
| 6,599,623 B2 * | 7/2003 | Gates et al. | 428/327 |
| 6,819,845 B2 * | 11/2004 | Lee et al. | 385/122 |
| 6,899,947 B2 * | 5/2005 | Wei et al. | 428/323 |

* cited by examiner

*Primary Examiner*—Shean C. Wu
(74) *Attorney, Agent, or Firm*—Sacco & Associates, PA

(57) ABSTRACT

An optically active composition (100) for optical applications has been identified. The optically active composition (100) can include at least one cyclic molecule having a nanocore (112) disposed within the cyclic molecule to form a filled ring (108). The composition (100) is optically transmissive for at least one photonic wavelength that would not otherwise be transmitted by the composition (100) if the nanocore were absent from the cyclic molecule. The cyclic molecule can be a carbon ring, an aromatic ring, or a heterocyclic ring. The filled ring (108) can be attached to a chiral molecule which is a repeat unit (102) in a polymeric backbone. A second filled ring (110) which causes the composition to be optically transmissive at a second wavelength also can be attached to the chiral molecule (102) as well. An electric field can be applied to the filled ring (108) to adjust the wavelength at which filled ring (108) is transmissive.

41 Claims, 4 Drawing Sheets

TUNABLE CHIRAL FILM OPTICAL FILTER

BACKGROUND OF THE INVENTION

1. Statement of the Technical Field

The inventive arrangements relate to light filters, and more particularly to light filters incorporating chiral films.

2. Description of the Related Art

Chiral films have been used to filter light in a variety of optical applications including sunglasses, movie projectors, instrumentation and polarizing windows, but chiral films have not been used to provide spectral selection in Micro-Opto-Electro-Mechanical Systems (MOEMS) communications systems. In particular, chiral film fabrication typically requires a multi-step synthetic process, which is very costly. Further, the transmission efficiency of chiral films usually is not adequate for use in MOEMS devices.

Light filters that have been used in MOEMS devices typically filter only a single fixed band of wavelengths. Accordingly, the bandwidth of the MOEMS devices cannot be adjusted once the MOEMS devices are fabricated. Thus, the performance of a MOEMS device may not be optimized for a particular system in which the device will be used.

SUMMARY OF THE INVENTION

The present invention relates to an optically active composition, for instance a cholesteric liquid crystal surface film. The optically active composition can include at least one cyclic molecule and a nanocore disposed within the cyclic molecule to form a filled ring. The composition is optically transmissive for at least one photonic wavelength that would not otherwise be transmitted by the composition if the nanocore were absent from the cyclic molecule. The cyclic molecule can be a carbon ring, an aromatic ring, or a heterocyclic ring. For example, the cyclic molecule can be a cyclooctane structure. At least a second filled ring can be provided as well. The second filled ring can cause the composition to be optically transmissive at a second wavelength.

The filled ring can be attached to a chiral molecule, for instance a chiral molecule which is a repeat unit in a polymeric backbone. The second filled ring also can be attached to the chiral molecule. The polymeric backbone can include a halogen side group and a halogen end group. For example, fluorine can be attached to the backbone as the side group and/or the end group.

The nanocore within the cyclic molecule can be a crystalline material, for example a metal crystal, a metal alloy crystal, or a semi-conductor crystal. More particularly, the nanocore within the cyclic molecule can be Gallium Arsenide (GaAs) or Gallium Indium Phosphide (GaInP).

The photonic wavelength at which the composition is transmissive can be adjustable. For example, the wavelength at which the composition is transmissive can be varied in response to an electric field which is applied to the composition that changes a position of the filled ring with respect to the chiral molecule.

A method of forming the optically active composition can include the steps of providing a cyclic molecule and disposing a nanocore within the cyclic molecule to form a filled ring. The filled ring then can be attached to a polymeric backbone.

The present invention also relates to an optical filter which includes the optically active film. The optical filter can be coupled to an optical transceiver, a mirror array or a microoptoelectromechanical system (MOEMS) device. The optically active film can be applied using a chemical vapor deposition process or a physical deposition process. The deposition thickness of the optically active film can be approximately 1 $\mu$m to 2 $\mu$m. The optical filter also can include an electric field generator which generates an electric field. The electric field can cause the wavelength at which the film is transmissive to be varied.

DETAILED DESCRIPTION OF THE PREFERRED EMBODIMENTS

The present invention relates to an optically active composition, such as an optically active film which can be used to filter light. The film allows the transmission of light having specific wavelengths while substantially blocking the transmission of light at other wavelengths. As used herein, "light" means not only signals in the spectrum of visible, ultraviolet and infrared light, but also signals in the full spectrum of frequencies typically handled by optical transmission systems. The film includes one or more cyclic molecules which normally absorb light over broad range of wavelengths of light. Disposed within each cyclic molecule is a nanocore which causes each cyclic molecule, referred to as a "filled ring," to be optically transmissive at a specific wavelength. The bandwidth over which the nanocores are optically transmissive is very narrow. Accordingly, the active film of the present invention is well suited for applications requiring light to be filtered with a high degree of selectivity.

As defined herein, a nanocore is a crystalline structure which can be inserted inside a cyclic molecule to form a filled ring. For example, a nanocore can be a metal crystal, a metal alloy crystal, or a semiconductor crystal. The filled ring can be attached to a carbon containing monomer which can be polymerized to create a polymeric backbone. The polymeric backbone can have a chiral structure such that the position of the filled rings, with respect to the backbone, can be changed. In particular, an application of an electric field can rotate the filled rings around the chiral centers of the polymeric backbone. In consequence, the transmission characteristics of the filled rings can be tuned. For example, the bandwidth and the wavelength at which filled rings are transmissive can be adjusted.

Figure 1:
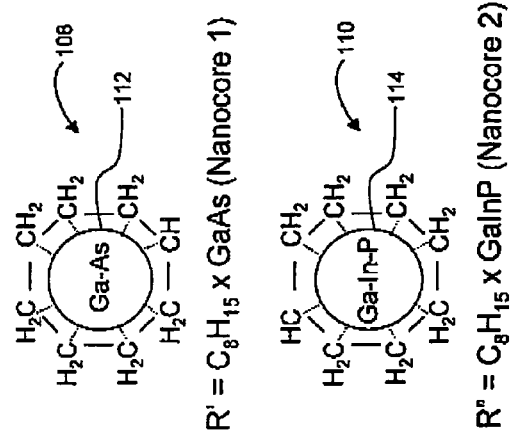
FIG. 1 is an exemplary chemical structure that is useful for understanding the optically active film of the present invention.

Referring to FIG. 1, an exemplary polymer 100 that is useful for understanding the optically active film of the present invention is shown. The polymer 100 can include repeat units 102. The repeat units 102 can be molecules that contain chiral carbon center. An example of a molecule containing chiral carbon is (Al—C*—P)$_n$, as shown in FIG. 1. Further, one or more filled rings can be attached to the repeat units 102. For instance, two filled rings 108, 110 can be attached to the repeat units 102. Advantageously, the repeat units 102 can be polymerized to form a polymeric backbone. Polymer systems are relatively easy to control during a deposition onto Micro-Opto-Electro-Mechanical Systems (MOEMS) or other optical surfaces. The chiral structure of the repeat units facilitates tuning of the optically active film, as further discussed below. Nonetheless, the present invention is not so limited. For instance, the filled rings 108, 110 can be disposed within a composition wherein the filled rings are not bonded to a polymeric backbone.

In the example shown, fluorine (F) atoms can be attached to the repeat units 102 as side groups 104 and end groups 106 to form a fluoropolymer. Fluoropolymers typically show a high degree of reliability in high moisture/high humidity environments. Fluoropolymers also have a low dielectric constant and are resistive to oxidation. Moreover, fluorine groups are extremely electronegative, thus they bond very well to the repeat units 102. Nonetheless, other materials can be used for the side groups and end groups. Other halogens can be used as side and end groups, such as chlorine and bromine, however these elements will tend to decrease the water resistance of the bulk polymer.

As noted, filled rings 108, 110 can be attached to a repeat unit 102 as pendent groups via covalent bonding. The filled rings 108, 110 can be synthesized from cyclic molecules that absorb light over a broad range of wavelengths. For example, the cyclic molecules can be cycloalkanes (e.g. cyclooctane, cyclononane, cyclodecane, etc.), or heterocyclic rings, such as nitrogen containing rings. Such cyclic molecules can absorb light over a broad spectrum.

A nanocore 112, 114 can be disposed within each cyclic molecule to form filled rings 108, 110. Van der Waals forces can stabilize the nanocores 112, 114 within the cyclic molecules. As noted, the nanocores 112, 114 can be a metal crystal, a metal alloy crystal, or a semi-conductor crystal. For example, the nanocores 112, 114 can comprise Gallium Arsenide (GaAs) or Gallium Indium Phosphide (GaInP). Still, other crystals can be used and the present invention is not so limited. Examples of other nanocore materials include Gallium Indium Arsenide (GaInAs) and Gallium Indium Antimonide (GaInSb).

The filled rings 108, 110 can exhibit a high transmission efficiency over a narrow range of wavelengths. For instance, the polymer 100 comprising the filled rings 108, 110 can have a transmission efficiency of 98% or higher when the film thickness is 1 $\mu$m to 2 $\mu$m. Importantly, the wavelengths at which the filled rings 108, 110 become transmissive is dependent on the crystalline structure that is used. For instance, a filled ring 108 having a GaAs nanocore 112 can be transmissive at approximately 830 nm and a filled ring 110 having a GaInP nanocore 114 can be transmissive at approximately 1550 nm. The exact wavelength at which the filled rings 108, 110 are transmissive can vary depending on the size of the nanocores 112, 114, the nanocrystal composition, as well as the orientation of the filled rings 108, 110 with respect to the polymeric backbone.

The openings provided by the cyclic molecules used to synthesize the filled rings 108, 110 should be large enough to contain the respective nanocores 112, 114. If openings provided by the cyclic molecules are too large, however, the nanocores 112, 114 can become unstable within the cyclic molecules, which will negatively affect transmission efficiency. Hence, the size of the cyclic molecule should be optimized for the size of the nanocore 112, 114 which will be used. It is also preferred that the cyclic molecules have a narrow distribution of sizes. For example, if the nanocore comprises a GaAs crystal or a GaInP crystal having a median base diameter of 850±120 Angstroms, a preferable cyclic molecule is a cyclooctane ($C_8H_{16}$) based ring. For larger size crystals, other filled rings can be synthesized from a carbon ring having any of the following chemical formulas: $C_9H_{18}$, $C_{10}H_{20}$, $C_{11}H_{22}$, $C_{12}H_{24}$, $C_{13}H_{26}$, $C_{14}H_{28}$, and so on. As noted, heterocyclic rings also can be used. It may be possible to use aromatics where the nanocore is sufficiently small enough to fit within the opening provided by the aromatics. For instance, to fit within an aromatic ring, the nanocore generally should be less than 1 nm.

To tune the filled ring 108, 110 transmission characteristics, an electric field can be applied to the film to rotate the filled rings 108, 110 with respect to the chiral molecules which are repeat units (102) in the polymeric backbone. The applied electric field can rotate the filled rings 108, 110 toward each other to reduce the distance between the filled rings. For instance, steric hindrance can keep the filled rings 108, 110 normally disposed so that they are separated by approximately 180° relative to the repeat unit (102) which can be a chiral molecule of the polymeric backbone. The presence of the electric field can adjust the separation anywhere in the range of 30°–180°. Such tuning can be used to adjust both the optimal spatial wavelength and the bandwidth of the light that is transmitted.

For example, a bias voltage can be applied across the filled rings 108, 110 and adjusted to vary the electric field intensity between 0.8 V/m and 3.5 V/m, which in turn varies the optimal spatial wavelength of the filled ring 108 from 820 nm to 840 nm. The electric field intensity also can be varied to adjust the optimal spatial wavelength of the filled ring 110 from 1530 to 1570 nm. Further, as the electric field intensity is increased, the bandwidth at which the filled rings 108, 110 are transmissive decreases. The bandwidth decreases as a result of specific spatial tuning of the GaAs and GaInP nanocores that corresponds to frequency transmission.

The electric field intensity (E) is proportional to a bias voltage applied across the filled rings 108, 110. Moreover, E is a function of the distance between electrodes used to apply the bias voltage and the permittivity of the volume disposed between the electrodes, which in this case can be the film comprising the filled rings 108, 110.

In an alternate arrangement, paramagnetic or ferromagnetic elements can be incorporated into the filled ring 108, 110. Accordingly, a magnetic field can be coupled to the film to effect rotation of the filled rings 108, 110 about the repeat unit (102) in the polymer backbone. The strength of the magnetic field that is required to tune such a film is inversely proportional to the permeability of the paramagnetic or ferromagnetic elements.

Importantly, a variety of filled rings 108, 110 can be attached to the repeat unit 102 so that the film is transmissive at multiple wavelengths. For example, filled rings 108 and filled rings 110 can be attached to a single polymeric backbone. Accordingly, the film can be transmissive at both 830 nm and 1550 nm. A film which can pass such frequencies, especially with a very narrow bandwidth, is very beneficial. For example, the present invention can be used in MOEMS, free space telecommunications, optical communications, medical spectroscopy, or any other application requiring light filters which can pass multiple wavelengths with very narrow bandwidths. In particular, the film of the present invention can be very beneficial for applications requiring light to be transmitted over large distances, for instance at distances greater than 1 km. Over such distances an optical signal, such as a light pulse, can be significantly affected by scattering, inter-mixing with ambient light and noise, each of which degrades the optical signal. As a light filter, the film of the present invention can improve the quality of such degraded optical signals.

The optically active film of the present invention can be applied to a variety of optical devices. For instance, the film can be applied to optical lenses, mirrors, MOEMS devices, or any other surface requiring an optical film. Referring to FIG. 2A, an exemplary device 200 is shown which includes a mirror 210 and/or lens having a layer of optically active film 220. Electrodes 230, 240 can be disposed at opposing ends 222, 224 of the layer of film 220, respectively. The electrodes 230, 240 can be connected to respective terminals 252, 254 of a voltage source 250, thus enabling an electric field to be generated between the electrodes 230, 240, and through the film 220. In a preferred arrangement, the voltage source 250 is adjustable to provide a range of desired output voltages. For instance, the voltage source 250 can have an output voltage which is variable from 0 V to 2.5 V. Accordingly, the strength of the electric field can be adjusted to tailor the optical characteristics of the film 220.

Figure 2B:
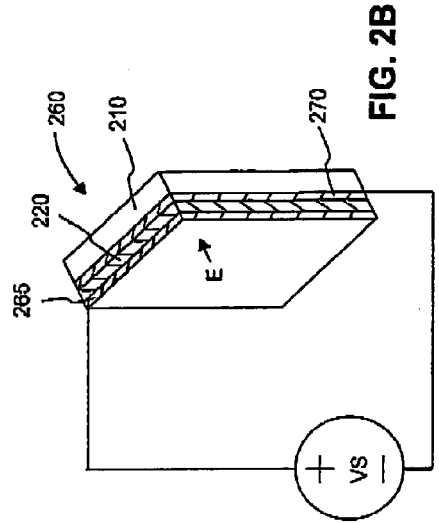
FIG. 2B is an alternate embodiment of an exemplary mirror incorporating an optically active film.
Figure 2A:
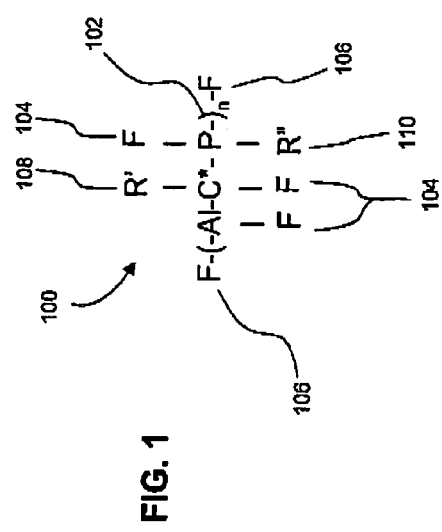
FIG. 2A is an exemplary mirror incorporating an optically active film which is useful for understanding the present invention.

In an alternate arrangement, as shown in FIG. 2B, an exemplary device 260 can include the mirror 210 and/or lens and the optically active film 220. Optically transparent electrodes 265, 270 which are coplanar with the film 220 can be provided. In this arrangement, an electric field can be generated which is normal to a planar surface of the film. The optically transparent electrodes 265, 270 can comprise, for example, Indium Tin Oxide (ITO) film. ITO can provide light transmittance in excess of 90% for wavelengths in the range of 500 $\mu$m to 2000 $\mu$m when the ITO film thickness is approximately 1500 angstroms. The ITO film can be grown on surfaces proximate to the film 220 using reactive R.F. sputter, or CVD deposition. This technique can facilitate the use of the present invention with MOEMS devices formed using deposition processes.

There are a number of deposition techniques that can be used to apply the optically active film comprising the filled rings 108, 110. For instance, the optically active film can be applied via chemical vapor deposition (CVD) or a vacuum deposition process, such as physical vapor deposition (PVD). CVD in particular ensures a uniform conformal deposition, even over surfaces that have complex geometries. Uniform conformal deposition is especially important for MOEMS devices. In the preferred arrangement, the deposition thickness is 1 $\mu$m to 2 $\mu$m.

Methods for Synthesizing Optically Active Film

The invention also features methods for synthesizing optically active film. Preferred methods include the steps of: (A) forming at least one filled ring comprising a nanocore disposed within a cyclic molecule as a first precursor (e.g. GaAs immobilized within a cyclooctane cyclic molecule); (B) attaching the filled ring to a second precursor to form an intermediate comprising monomers; and (C) processing the intermediate to form a polymer comprising repeat units having the filled rings attached. Additional precursor and intermediate steps can be performed, depending on the actual chemical composition and process that is used to synthesize the optically active film.

Reaction Conditions

Temperature

The step of placing the reaction mixture under conditions that result in the production of the chemical product in the reaction mixture typically comprises a step of adjusting the temperature of the reaction mixture to a temperature suitable for the reaction to proceed. The particular temperature or range of temperatures chosen will vary according to several parameters including the particular reaction selected, the concentration of the reactants in the reaction mixture, the pressure of the reaction mixture, etc. Such temperatures can be extrapolated from temperatures known to be optimal for reactions similar to those of the selected reaction (i.e., the conventional synthetic methods or similar methods) to get a general range of suitable temperatures. Experiments then can be performed by using conventional methods, and the temperature can be varied around the extrapolated general range of suitable temperatures to find suitable and/or optimal temperature(s) for the processes of the invention. Generally, those temperatures at which the greatest amount of chemical product is produced are preferred. For many reactions, suitable temperatures range from about 25° C. to about 250° C., although this range can vary substantially.

Pressure

The step of placing the reaction mixture under conditions that result in the production of the chemical in the reaction mixture can also comprise a step of adjusting the pressure of the reaction mixture to a pressure suitable for the reaction to proceed. The particular pressure or range of pressures chosen will vary according to several parameters including the particular reaction selected, the concentration of the reactants in the reaction mixture, the temperature of the reaction mixture, etc. Such pressures can be extrapolated from pressures known to be optimal for reactions similar to those of the selected reaction (i.e., the conventional synthetic methods or similar methods using reflux reactions, defluorination, polymerization, etc.) to obtain a general range of suitable pressures. Experiments then can be performed by performing the reactions of the invention in an adaptation of the conventional methods, and the pressure can be varied around the extrapolated general range of suitable pressures to find the most optimal pressure(s) for the processes of the invention. For example, those pressures at which the greatest amount of chemical product is produced might be optimal. For many reactions, suitable pressures range from about 10 mm Hg to about 1,000 mm Hg, although this range can vary substantially.

Duration

The duration of the reaction will depend upon the particular reaction and reaction conditions selected. Generally, the amount of time for the reaction to occur will vary from the time between (a) the initiation of the reaction and the first appearance of the chemical product and (b) the initiation of the reaction and the termination of chemical product synthesis (e.g. due to exhaustion of reagents or production of interfering by-products). Thus the reaction can last for less than a few seconds to several days or even longer.

Isolation of Reaction Products

Also within the invention is a method for isolating and/or purifying a chemical product from a reacted reaction mixture. This method can be performed by any technique known for separating a mixture of different substances. For example, this method can include a step of extraction, chromatography, distillation, filtering, rinsing, etc.

Purity of Reaction Components

Reactant components should be of 99% preferred purity, ACS Research Grade or equivalent. High purity reactants are preferred to eliminate potential sources of contamination that will reduce overall yield. Other sources of contamination can include impure reactants, reaction vessels, separation media, and wash solvents. Such contaminants should be minimized.

EXAMPLE

Figure 3:
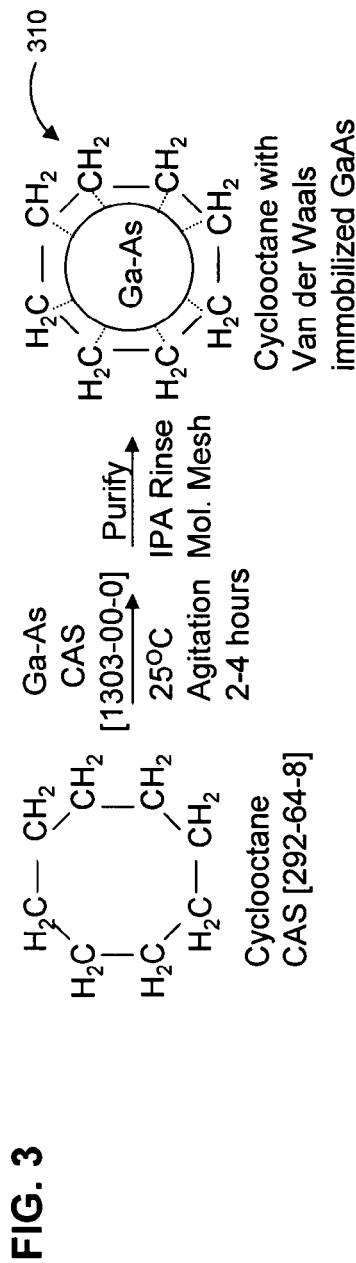
FIGS. 3–6 are exemplary chemical reactions that are useful for understanding a process of synthesizing the optically active film of the present invention.

Exemplary chemical reactions that are useful for understanding a process of synthesizing the optically active film of the present invention are shown in FIGS. 3–6. Referring to FIG. 3, a first process is shown to generate a first precursor by immobilizing GaAs crystals within cyclooctane molecules in a reflux reaction, thereby producing a solution of filled rings comprising cyclic molecules having GaAs nanocores disposed therein. For example, cyclooctane (e.g. CAS 292-64-8) can be mixed with GaAs (e.g. CAS 1303-00-0). The cyclooctane can be put into a reactor type of vessel, for instance a glass lined stainless steel reactor, and the GaAs then can be homogenously mixed into the cyclooctane. Preferably, the molar ratio of GaAs to cyclooctane should be at least two to one. The mixture of the cyclooctane and the GaAs can be mechanically or rotationally agitated for 2–4 hours at 25° C. under standard atmospheric conditions, for example approximately 760 mm Hg.

The reaction of the GaAs being immobilized within the cyclooctane is characterized as an exothermic reaction. Thus, the temperature of the mixture should be monitored to insure the mixture does not exceed the boiling point of cyclooctane, which is approximately 151° C. If this temperature is exceeded, the cyclooctane can degrade and generate thermal decomposition products.

When the agitation cycle is complete, the resulting solution will comprise filled rings 310 (first precursor) comprising GaAs nanocores immobilized within cyclooctane molecules. The first precursor will be in a liquid state. Excess GaAs molecules which do no react with the cyclooctane will precipitate out of the solution and can be removed. There may also be cyclooctane molecules which are not reacted which also can be removed. For example, the solution can be purified using an isopropyl alcohol rinse. A molecular mesh or a sieve technique also can be used to allow the lower formula weight materials, such as the un-reacted GaAs and cyclooctane, to pass through. The reaction yield should be approximately 60% or better.

Figure 4:
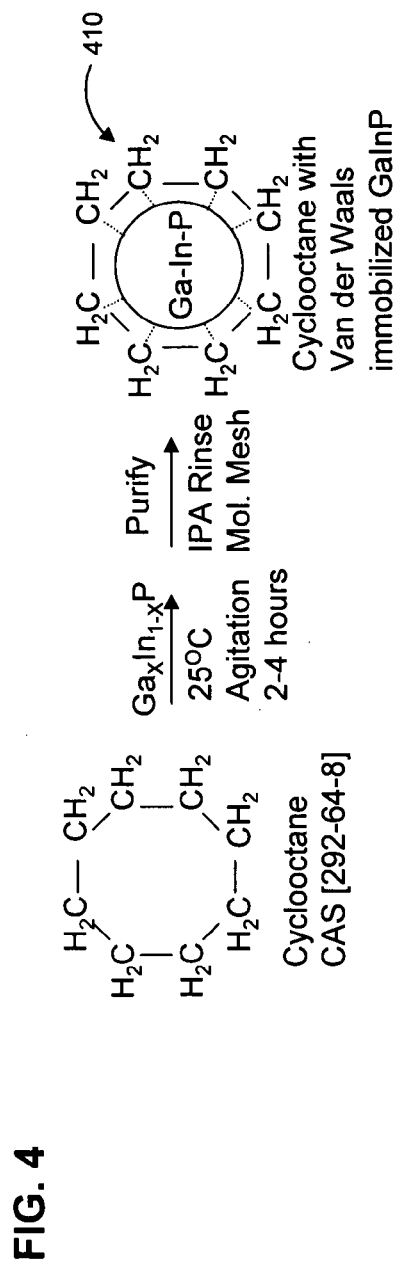

Referring to FIG. 4, a second process is shown for immobilizing GaInP crystals within cyclooctane molecules in a reflux reaction to produce a filled rings 410 (second precursor). The CAS number for indium is 7440-74-6 and the CAS number for gallium is 7440-55-3. The molar ratio of GaInP crystals to cyclooctane again should be two to one. Further, the second process can include the same mixing, agitation and purification steps and conditions as the first process described above for the first precursor.

Figure 5:
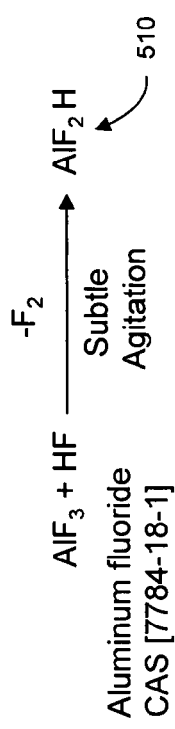

Referring to FIG. 5, a third process is shown for synthesizing a third precursor 510. The third precursor 510 can be aluminum difluorohydride ($AlF_2H$), which can be synthesized in a reflux reaction of aluminum fluoride ($AlF_3$), an anhydrous powder (CAS 7784-18-1), with hydrofluoric acid (HF). The molar ratio of $AlF_3$ to HF should be approximately one to one. The $AlF_3$ can be added to a hi-purity stainless steel reactor, for instance a 300 or 400 series stainless steel reactor, which is pre-heated to a temperature of about 150° C. The stainless steel reactor can be pre-heated in an oven or on a hot plate in a well ventilated area. The HF then can be added to the $AlF_3$ and the mixture can be subtly agitated for one hour. In a preferred arrangement, the agitation step can take place in a vacuum oven maintaining a temperature of approximately 150° C. and a vacuum pressure of approximately 5–25 mm Hg, which quickens the liberation of fluorine gas ($F_2$) from the mixture.

Figure 6A:
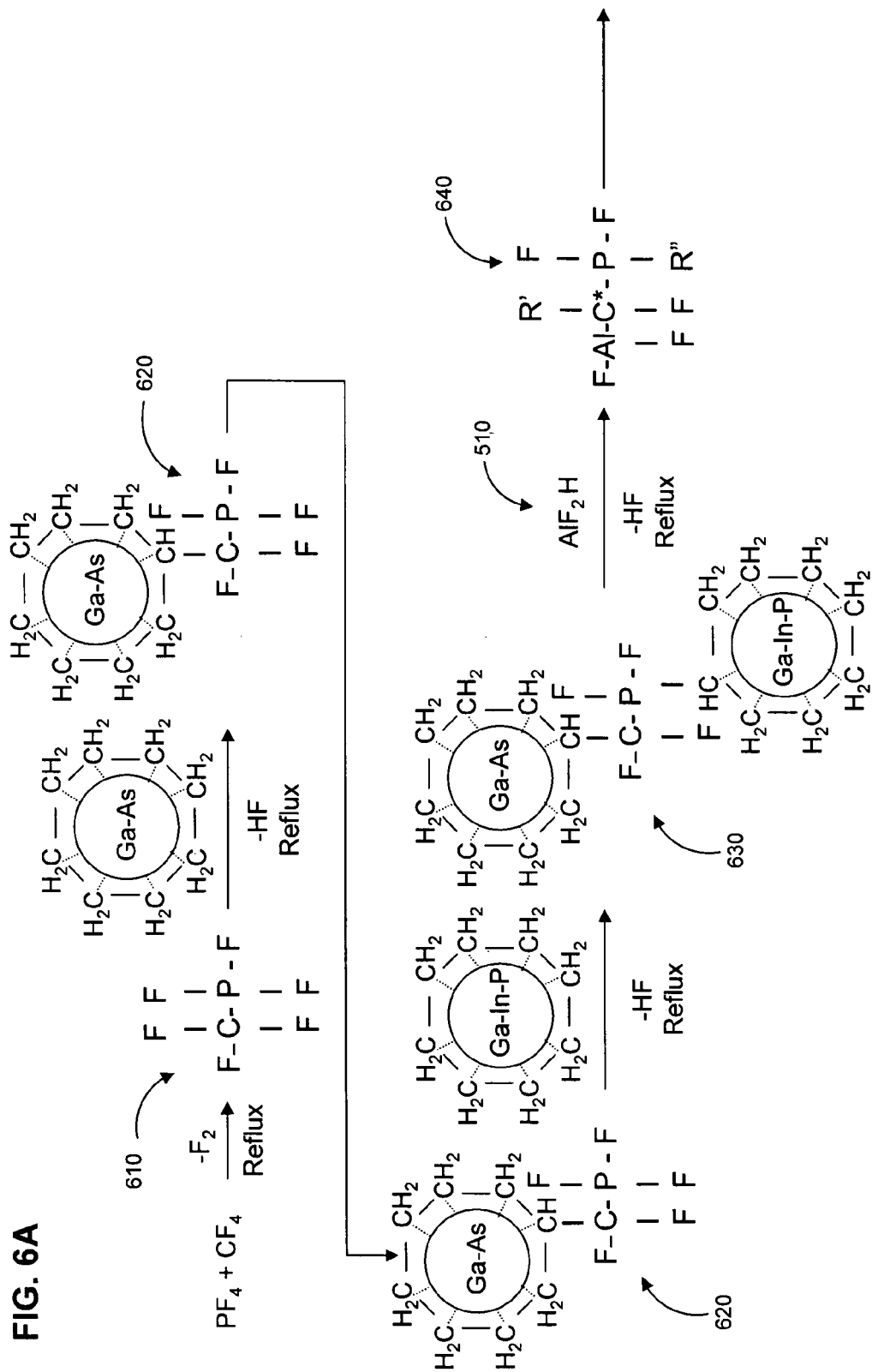
Figure 6B:
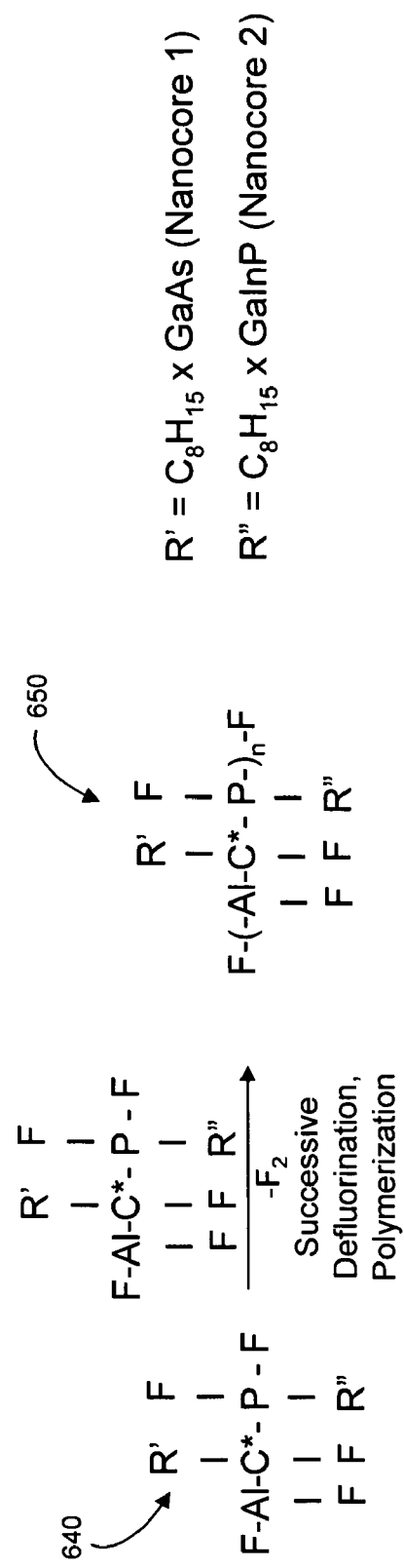

Referring to FIGS. 6A and 6B, a process is shown for forming a polymer having the filled rings attached as pendent groups. As shown in FIG. 6A, the process can begin by reacting phosphorous tetrachloride ($PF_4$) with carbon tetrafluoride ($CF_4$) to form a monomer, or first intermediate 610. The molar ratio of the $PF_4$ to the $CF_4$ should be approximately one to one. The mixture can undergo a reflux reaction wherein the mixture is boiled at 25° C.–50° C. at standard atmospheric pressure (approximately 760 mm Hg) in a stainless steel reactor for one hour to produce carbon phosphorous hexafluoride ($CPF_6$), as shown. Fluorine gas can be liberated from the first intermediate 610 during the process.

The first precursor 310 (cyclooctane with immobilized GaAs) then can be independently dripped into the first intermediate 610 to attach the first filled ring of the first precursor 310 to the intermediate 610 in a reflux reaction. For example, this process can be performed in a glass lined reactor or a stainless steel reactor having an inlet port for adding the first precursor 310 solution into the intermediate 610 solution in a one to one molar ratio. The reflux reaction should be performed at 50° C. for 4 hours at approximately standard atmospheric pressure. The reflux reaction will cause HF to be generated, which can be driven off as a gas or removed by a separation technique, for example with a molecular mesh separation technique. A second intermediate 620 can result from the reaction, as shown.

Next, the second precursor 410 can be reacted with the second intermediate 620 in a reflux reaction. A one to one molar ratio should be used. A second inlet port can be provided in the reactor to independently add the second precursor 410 to the second intermediate 620. Again, the reflux reaction should be performed at 50° C. for 4 hours at approximately standard atmospheric pressure to attach the second precursor 410 filled rings to the second intermediate 620 to form a third intermediate 630. HF, which is generated during the reflux reaction, again can be driven off as a gas or removed by a separation technique. Due to steric hindrance, the filled ring of the second precursor 310 will be prone to bond to a position on the second intermediate 620 molecule which is opposite of where the filled ring of the first precursor 410 is bonded. Moreover, in an unbiased state, the angle between the two filled rings with respect to the carbon phosphorous molecular core will approach approximately 180°.

In a next step, the third precursor 510, $AlF_2H$, can be reacted with the third intermediate 630 in a reflux reaction to form a fourth intermediate 640. Again, a one to one molar ratio should be used. The reflux reaction should be performed at 50° C. for 4 hours at approximately standard atmospheric pressure to bond aluminum and fluorine from the third precursor 410 into the third intermediate 630 to form a monomer 640. Excess HF can be precipitated out of the solution, driven off as a gas, or removed by a separation technique. Because HF is liberated from the reaction, the reaction should take place in a stainless steel or Teflon reactor.

Successive defluorination and polymerization then can be performed on the monomer 640 to form a polymer 650, which exhibits properties of a chiral film. Fluorine gas is expected to be liberated during this process. The fluorine groups that are located on the ends of the monomers are the least sterically hindered elements in the monomer. Thus, as the fluorine gas is being removed the viscosity of the solution undergoing polymerization will increase and start forming the chiral film. The release of fluorine gas can be monitored to evaluate progress of the reaction.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. An optically active composition of matter comprising:
   at least one cyclic molecule;
   a nanocore disposed within said cyclic molecule to form a filled ring; and
   a chiral molecule, said filled ring attached to said chiral molecule; and
   wherein said filled ring is optically transmissive for at least one photonic wavelength which is not transmitted by said cyclic molecule absent said nanocore.

2. The composition of claim 1, wherein said chiral molecule is a repeat unit in a polymeric backbone.

3. The composition of claim 1, wherein said cyclic molecule is selected from the group consisting of a carbon ring, an aromatic ring and a heterocyclic ring.

4. The composition of claim 1, wherein said cyclic molecule is cyclooctane.

5. The composition of claim 1, wherein said nanocore comprises a crystalline material.

6. The composition of claim 1, wherein said nanocore comprises a material selected from the group consisting of a metal crystal, a metal alloy crystal, and a semi-conductor crystal.

7. The composition of claim 1, wherein said nanocore comprises material selected from the group consisting of gallium arsenide (GaAs) and gallium indium phosphide (GaInP).

8. The composition of claim 1, wherein a photonic wavelength at which said composition is transmissive is tunable.

9. The composition of claim 8, wherein said photonic wavelength at which said composition is transmissive varies in response to an electric field applied to said composition.

10. The composition of claim 8, wherein a position of said filled ring with respect to said chiral molecule changes when the composition is in the presence of an electric field as compared to when the composition is not in the presence of said electric field.

11. The composition of claim 10, wherein said photonic wavelength at which said composition is transmissive adjusts responsive to said changing position of said filled ring.

12. The composition of claim 1, further comprising at least a second filled ring.

13. The composition of claim 12, wherein said composition is optically transmissive to at least a second photonic wavelength.

14. The composition of claim 1, further comprising a second filled ring attached to said chiral molecule.

15. The composition of claim 14, wherein said composition is optically transmissive to at least a second photonic wavelength.

16. The composition of claim 2, wherein said polymeric backbone comprises at least one of a halogen side group and a halogen end group.

17. The composition of claim 15, wherein at least one of said halogen side group and said halogen end group comprises fluorine.

18. The composition of claim 1, wherein said composition is a cholesteric liquid crystal surface film.

19. A method of forming an optically active composition comprising the steps of:
    providing at least one cyclic molecule;
    disposing a nanocore within said cyclic molecule to form a filled ring;
    providing a chiral molecule; and
    attaching said filled ring to said chiral molecule; and
    wherein said filled ring is optically transmissive for at least one photonic wavelength which is not transmitted by said cyclic molecule absent said nanocore.

20. The method of claim 19, wherein said chiral molecule is a repeat unit in a polymeric backbone.

21. The method of claim 19, further comprising the step of selecting said cyclic molecule from the group consisting of a carbon ring, an aromatic ring and a heterocyclic ring.

22. The method of claim 19, further comprising the step of providing cyclooctane as said cyclic molecule.

23. The method of claim 19, wherein said nanocore is a crystalline material.

24. The method of claim 19, further comprising the step of selecting said nanocore from the group consisting of a metal crystal, a metal alloy crystal, and a semi-conductor crystal.

25. The method of claim 19, further comprising the step of selecting said nanocore from the group consisting of gallium arsenide and gallium indium phosphide.

26. The method of claim 19, wherein a photonic wavelength at which said composition is transmissive is tunable.

27. The method of claim 19, further comprising the step of applying an electric field to said composition, wherein said photonic wavelength at which said composition is transmissive varies in response to said applied electric field.

28. The method of claim 27, wherein a position of said filled ring with respect to said chiral molecule changes when the composition is in a presence of an electric field as compared to when the composition is not in the presence of said electric field.

29. The method of claim 28, wherein said photonic wavelength at which said composition is transmissive varies responsive to said changing position of said filled ring.

30. The method of claim 19, further comprising the step of providing at least a second filled ring.

31. The method of claim 30, wherein said composition is optically transmissive to at least a second photonic wavelength.

32. The method of claim 19, further comprising the step of attaching at least a second filled ring to said chiral molecule.

33. The method of claim 32, wherein said composition is optically transmissive to at least a second photonic wavelength.

34. The method of claim 20, wherein said polymeric backbone comprises at least one of a halogen side group and a halogen end group.

35. The method of claim 34, wherein at least one of said halogen side group and said halogen end group comprises fluorine.

36. The method of claim 19, wherein said composition is a cholesteric liquid crystal surface composition.

37. An optical filter comprising:
    an optically active film which comprises:
    at least one cyclic molecule;
    a nanocore disposed within said cyclic molecule to form a filled ring; and
    a chiral polymeric backbone wherein said filled ring is attached to said chiral polymeric backbone;
    wherein said filled ring is optically transmissive for at least one photonic wavelength which is not transmitted by said cyclic molecule absent said nanocore.

38. The optical filter of claim 37, wherein said optical filter is coupled to at least one device selected from the group consisting of an optical transceiver, a mirror array and a Micro-Opto-Electro-Mechanical Systems (MOEMS) device.

39. The optical filter of claim 37, wherein said optically active film is applied to said at least one device using at least one of a chemical vapor deposition process and a physical vapor deposition process.

40. The optical filter of claim 39, wherein a deposition thickness of said optically active film is approximately 1 $\mu$m to 2 $\mu$m.

41. The optical filter of claim 37, further comprising an electric field generator which generates an electric field that causes at least one photonic wavelength at which said film is transmissive to vary as compared to a condition in which no electric field is generated.

* * * * *